US010702784B2

(12) United States Patent
Kim et al.

(10) Patent No.: US 10,702,784 B2
(45) Date of Patent: Jul. 7, 2020

(54) THEME PARK SYSTEM FOR VEHICLE DRIVING

(71) Applicant: MONOLITH INC., Jeju-si, Jeju-do (KR)

(72) Inventors: Na Young Kim, Seoul (KR); Jong Seok Kim, Jeju-si (KR); Hye Jeong Chun, Yongin-si (KR)

(73) Assignee: MONOLITH INC., Jeju-si (KR)

( * ) Notice: Subject to any disclaimer, the term of this patent is extended or adjusted under 35 U.S.C. 154(b) by 0 days.

(21) Appl. No.: 16/432,169

(22) Filed: Jun. 5, 2019

(65) Prior Publication Data

US 2019/0282908 A1 Sep. 19, 2019

Related U.S. Application Data

(63) Continuation of application No. PCT/KR2018/001737, filed on Feb. 9, 2018.

(30) Foreign Application Priority Data

Feb. 13, 2017 (KR) .......................... 10-2017-0019652

(51) Int. Cl.
*A63G 25/00* (2006.01)
*H04W 4/44* (2018.01)
(Continued)

(52) U.S. Cl.
CPC ............... *A63G 25/00* (2013.01); *A63K 1/00* (2013.01); *A63K 99/00* (2013.01); *G08G 1/164* (2013.01);
(Continued)

(58) Field of Classification Search
CPC ........ A63G 21/00; A63G 25/00; A63G 31/00; A63G 33/00; A63B 67/00; G06F 3/00; G06F 3/01
(Continued)

(56) References Cited

U.S. PATENT DOCUMENTS 6,220,965 B1 * 4/2001 Hanna ...................... A63G 7/00
463/52
2015/0336015 A1 * 11/2015 Blum ...................... A63G 33/00
472/137
2016/0048203 A1 * 2/2016 Blum ....................... G06F 3/012
104/84

FOREIGN PATENT DOCUMENTS

JP 05-228264 A 9/1993
KR 10-0606287 B1 7/2006
(Continued)

OTHER PUBLICATIONS

International Search Report issued in PCT/KR2018/001737; dated May 9, 2018.
(Continued)

*Primary Examiner* — Kien T Nguyen
(74) *Attorney, Agent, or Firm* — Studebaker & Brackett PC

(57) ABSTRACT

Disclosed is a theme park system for vehicle driving, the system comprising an integrated operating server for: receiving sensor information, through one or more tracks including at least one sensor and a dedicated internal network used inside a theme park for vehicle driving, from the one or more tracks and one or more vehicles driving on the one or more tracks; receiving user information from one ore more user clients by using an external communication network which is not overlapped with the internal network; generating driving information on one or more vehicles by using the received sensor information; and managing the theme park system on the basis of the generated driving information and the received user information.

19 Claims, 5 Drawing Sheets

(51) Int. Cl.
  *A63K 1/00* (2006.01)
  *G08G 1/16* (2006.01)
  *H04L 29/08* (2006.01)
  *H04W 4/021* (2018.01)
  *H04W 4/02* (2018.01)
  *A63K 99/00* (2006.01)
  *A63G 31/00* (2006.01)
(52) U.S. Cl.
  CPC .............. *H04L 67/12* (2013.01); *H04L 67/16* (2013.01); *H04W 4/021* (2013.01); *H04W 4/027* (2013.01); *H04W 4/44* (2018.02)
(58) Field of Classification Search
  USPC ........... 472/43, 59–60; 463/5, 30, 34, 50–53
  See application file for complete search history.

(56) References Cited

FOREIGN PATENT DOCUMENTS

| KR | 10-2014-0104527 A | 8/2014 |
|---|---|---|
| KR | 10-1680785 B1 | 11/2016 |
| KR | 10-2017-0010808 A | 2/2017 |
| WO | 2007/013222 A1 | 2/2007 |
| WO | 2007/022489 A2 | 2/2007 |
| WO | 2011/053357 A1 | 5/2011 |
| WO | 2015/179661 A1 | 11/2015 |

OTHER PUBLICATIONS

An Office Action mailed by the Japanese Patent Office dated Dec. 24, 2019, which corresponds to Japanese Patent Application No. 2018-561244 and is related to U.S. Appl. No. 16/432,169.

The extended European search report issued by the European Patent Office dated Nov. 18, 2019, which corresponds to European Patent Application No. 18750992.2-1126 and is related to U.S. Appl. No. 16/432,169.

An Office Action mailed by the New Zealand Patent Office dated Feb. 20, 2020, which corresponds to New Zealand Patent Application No. 754263 and is related to U.S. Appl. No. 16/432,169.

* cited by examiner

THEME PARK SYSTEM FOR VEHICLE DRIVING

CROSS-REFERENCE TO RELATED APPLICATIONS

The present application is a continuation of International Patent Application No. PCT/KR2018/001737, filed Feb. 9, 2018, which is based upon and claims the benefit of priority to Korean Patent Application No. 10-2017-0019652, filed on Feb. 13, 2017. The disclosures of the above-listed applications are hereby incorporated by reference herein in their entirety.

BACKGROUND

Embodiments of the inventive concept described herein relate to a theme park system for vehicle driving.

In recent years, vehicles combined with the communication technologies have been released according to the development of the communication technologies, and particularly in relation to the racing vehicles in a theme park, the technologies for transmitting vehicle state information of the racing vehicles to external devices by using wired/wireless communication by the relay devices around the vehicles have appeared.

Meanwhile, the riding experiences of racing vehicles provided to the visitors or users in the existing theme parks may be intervened unilaterally only by managers of the racing vehicles, and the visitors or users may use the racing vehicles in a limited manner because it is not possible for the visitors or users to intervene the riding of the racing vehicles at all or the opportunities for the interventions are very rare.

In this way, because the possibilities of intervening the experiences of the racing vehicles provided in the theme parks by the visitors or users are relatively small, it is difficult for the visitors or users who ride the racing vehicles to evaluate their driving skills by themselves or for their driving skills to be evaluated by others when they ride the racing vehicles, and accordingly, there exists a limit in inducing challenge motives for driving of the racing vehicles.

Further, through driving results (numerical data such as lap times or ranks and driving images) that may be obtained through the riding experiences of the racing vehicles, a passenger may share the result with a second passenger who has a similar experience while competing with the second passenger, and may give motives of experiencing riding of the vehicles to general customers which do not ride the vehicles yet.

Accordingly, detailed method for generating and exchanging driving-based contents that may be targets for sharing and analysis, by which the visitors or users may be provided with motives for improvement of driving skills for the driving vehicles by using the wired/wireless communication technologies that may be combined with the racing vehicles and invoking a new challenge are required.

SUMMARY

Embodiments of the inventive concept provide a theme park system for vehicle driving.

The technical objects of the inventive concept are not limited to the above-mentioned ones, and the other unmentioned technical objects will become apparent to those skilled in the art from the following description.

In accordance with an aspect of the inventive concept, there is provided a theme park system for vehicle driving, including one or more tracks including at least one sensor, and an integrated operating server configured to receive sensor information from the one or more track and one or more vehicles that travel on the one or more tracks through an internal dedicated network used in the interior of a theme park for vehicle driving, receive user information from one or more user client by using an external communication network that does not overlap the internal dedicated network, generate driving information of the one or more vehicles by using the received sensor information, and manage the theme park system based on the generated driving information and the received user information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
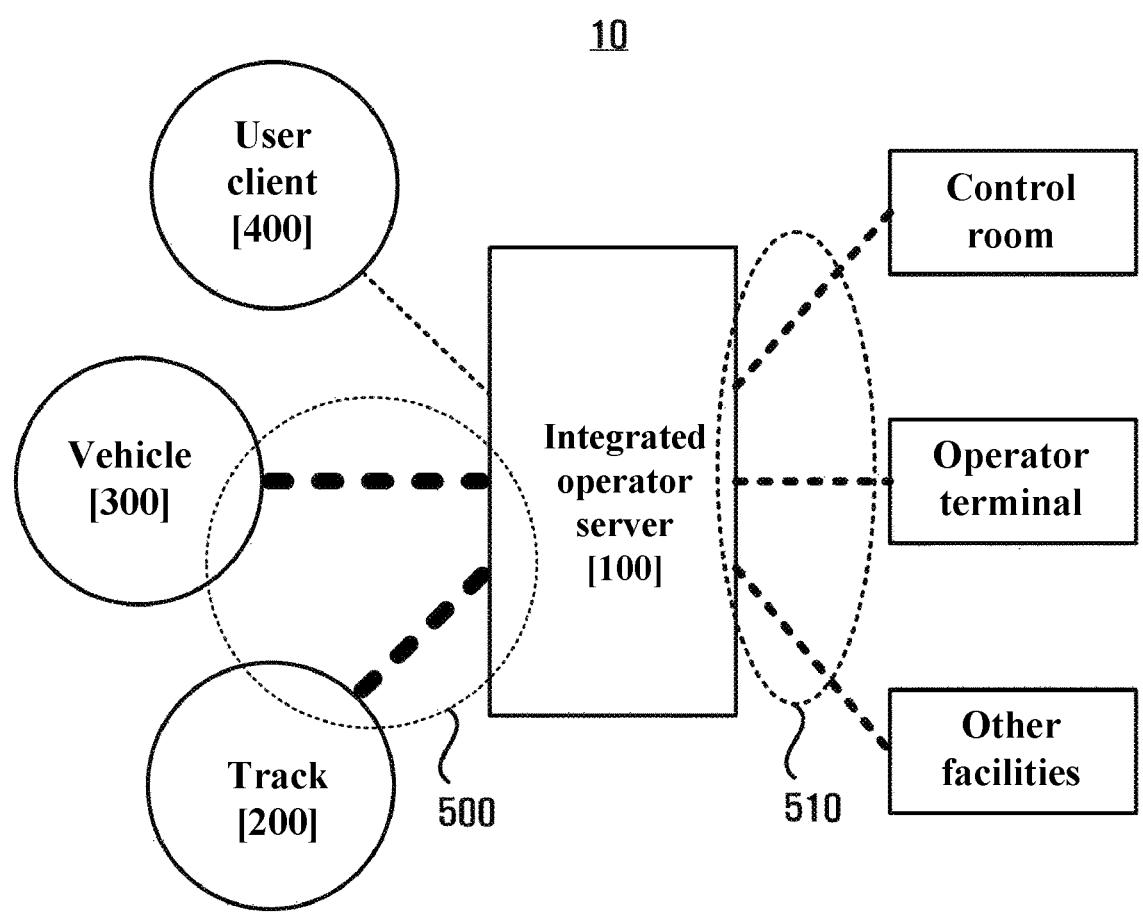
FIG. 1 is a diagram illustrating a theme park system for vehicle driving according to an embodiment.

In accordance with an aspect of the inventive concept, there is provided a theme park system for vehicle driving, including one or more tracks including at least one sensor, and an integrated operating server configured to receive sensor information from the one or more track and one or more vehicles that travel on the one or more tracks through an internal dedicated network used in the interior of a theme park for vehicle driving, receive user information from one or more user client by using an external communication network that does not overlap the internal dedicated network, generate driving information of the one or more vehicles by using the received sensor information, and manage the theme park system based on the generated driving information and the received user information.

The one or more tracks may be customized tracks, starting points of which are located at sites that are higher than ending points thereof and which are programmed by reflecting characteristics of a specified racing vehicle, wherein the lengths, the slopes, the radii of rotation, and the cants of the one or more tracks may be designed such that the specified racing vehicle has at least one a specified longitudinal acceleration and a specified transverse acceleration, and wherein the driver is allowed to feel a programmed level of difficulty while driving the specified racing vehicle on the one or more tracks.

The one or more vehicles may be compact vehicles which perform non-powered driving using the gravity, which increase aerodynamic efficiency by lowering ground clearances thereof, and parts of which are disposed in frames thereof in an integrated way.

Each of the one or more vehicles may include a steering device using a spherical plane, and a rotor located inside wheels of the one or more vehicles, and a size and a shape of the rotor may be machined to be located inside the wheels of the one or more vehicles.

Each of the one or more vehicles may be a vehicle that is temporarily accelerated by a power device.

Each of the one or more tracks may further include a guide line for moving the vehicle from an ending point of the track to a starting point of the track, and the vehicle may automatically move from the ending point of the track to the starting point of the track along the guide line if the driving is ended.

A vehicle identification (ID) for identifying the one or more vehicles may be allocated to each of the one or more vehicles, a track ID for identifying the one or more tracks may be allocated to each of the one or more tracks, one or more user IDs for distinguishing the one or more users who use the one or more user clients may be allocated to each of the one or more user clients, a reservation ID may be allocated to a driving reservation of each of the one or more users when the one or more users make a reservation for driving, and the integrated operating server may generate a driving ID by using at least one of the user IDs of the one or more users, the reservation IDs for the driving reservations of the one or more users, the vehicle IDs of the vehicles used by the one or more users, and the track IDs of the tracks on which the vehicles travel, and classifies the generated driving information by using the generated driving IDs.

Each of the one or more vehicles may include at least one sensor, and the sensor information collected by the at least one sensor included in the one or more vehicles and the one or more tracks may be classified into real-time data and non-real-time data, an information transmission frequency is determined for the real-time data, the real-time data may be delivered to the integrated operating server according to the determined information transmission frequency while the one or more vehicles travel, and the non-real-time data may be delivered to the integrated operating server after the driving of the one or more vehicles is ended.

The sensor information may include a speed, a transverse acceleration, location information, a yaw rate, and a driving image collected by the one or more sensors mounted on the one or more vehicles, and the integrated operating server may analyze the sensor information, generates additional information including rankings of the one or more vehicles, and may provide a user service including the generated additional information to the user client.

The integrated operating server may obtain driving information of a first vehicle that is one of the one or more vehicles by using the received sensor information, may receive user information of a first user who drives the first vehicle, may determine a ranking of the first vehicle based on the driving information of the first vehicle, and may provide a point for classifying a virtual coin that is used in the theme park and a user rank to the user based on the determined ranking.

The integrated operating server may receive reservation request information from a first user client, obtains information on the one or more vehicles and use states of the one or tracks, makes reservations for a vehicle and a track that are to be used by the first user client, and may transmit reservation completion information to the first user client.

The integrated operating server may determine a danger of accidents of the one or more vehicles based on the driving information of the one or more vehicles and may transmit a control signal to control driving of the second vehicle that is determined to have a danger of an accident to the second vehicle through the internal dedicated network.

Each of the one or more tracks may be divided into one or more zones, and one or more sensors are installed in each of the one or more zones, and the integrated operating server may determine driving periods of time for the zones of the vehicle that travel on the one or more tracks and the number of vehicles that travels the zones by using the one or more sensors installed in each of the one or more zones.

The theme park system may further include an integrated control monitor installed in an integrated control room of the theme park and configured to display an operation situation of the theme park, and one or more display device installed at several sites of the theme park and configured to display information on the theme park, the integrated operating server may display the operation situation of the theme park on the integrated control monitor by using the information received from the one or more vehicles and the one or more tracks, and the integrated control monitor may transmit information that is necessary for the one or more display devices.

The theme park system may further include one or more detection devices for detecting an emergency situation including a fire of the theme park, a natural disaster, or an abnormality of communication, when one or more detection devices detect an emergency situation, the integrated operating server may automatically take an emergency contact with an external institute and displays information on the emergency situation on the integrated control monitor.

The theme park system may further include an information collecting device configured to collect information from the user client or a ticket issued by the theme park, and an access control device for controlling an access to the track, and the integrated operating server may determine an access authority for the track of the user based on the information collected by the information collecting device and may control the access control device based on a determination result.

The integrated operating server may control lighting and acoustic systems of the theme park.

The theme park system may further include a preservation facility for preserving the one or more vehicles, and the integrated operating server may determine a state of the preservation facility, controls the preservation facility according to a determination result, and may manage states of the one or more vehicles and a driving history by using the vehicle IDs of the one or more vehicles preserved in the preservation facility.

Detailed items of the other embodiments are included in the detailed description and the accompanying drawings.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

In the specification, the 'vehicle' is used as a concept that comprehensively indicates a general-purpose driving object or driving mechanism that may perform non-powered driving. For example, the vehicle generically includes not only a two-wheeled vehicle, a three-wheeled vehicle, and a four-wheeled vehicle including one or more wheels but also a driving object in the form of a luge and a wheeled sled, and the inventive concept is not limited thereto.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings.

FIG. 1 is a diagram illustrating a theme park system for vehicle driving according to an embodiment.

According to the disclosed embodiments, the theme park system 10 for vehicle driving includes an integrated operating server 100 and one or more tracks 200. Each of the one or more tracks 200 includes at least one sensor for obtaining driving information of one or more vehicles 300.

The integrated operating server 100 may include a cloud server, an IP multimedia subsystem (IMS) server, a telephony application server, an instant messaging (IM) server, a media gateway control function (MGCF) server, a messaging gateway (MSG) server, and a call session control function (CSCF) server, and the integrated operating server 100 may be realized by a device that refers to an object, such as a personal computer (PC), a laptop computer, and a tablet personal computer (PC), which may transmit and receive data.

The track 200 includes at least one sensor that may recognize presence, the speed, the location, or the like of a vehicle. For example, the at least one sensor included in the track 200 may function to recognize the locations of the vehicles, the distance between the vehicles on the track, the speeds and lap times of the vehicles in a specific zone, and the number of vehicles that are present in the zone to inform the integrated operating server 100 of a current state and occurrence of an abnormality in real time.

Each of the one or more vehicles 300 includes at least one sensor for obtaining driving information of the one or more vehicles 300.

The vehicle 300 employs various sensors including a laser, a magnet, an ultrasonic wave, a steering angle sensor, a brake sensor, a GPS, and an action camera to collect various pieces of driving information that are received while the vehicle 300 travels on the track. The driving information includes a lap time, lap times for zones, a location, a speed, and a driving image of the vehicle on the track.

The vehicle 300 includes a control unit (main ECU) configured to control the above-mentioned at least one sensor. The control unit of the vehicle 300 transmits driving information obtained from the at least one sensor to the integrated operating server 100.

In an embodiment, the track 200 includes a downhill road. For example, a starting point of the track 200 may be located higher than an ending point of the track 200. Further, the vehicle 300 performs non-powered driving using the gravity on the track 200.

Accordingly, the starting point of the track 200 is located at a site that is higher than the ending point of the track 200, and the track 200 is a customized track that is programmed while reflecting the dynamic characteristics of the vehicle 300.

For example, the vehicle 300 is designed to increase aerodynamic efficiency by lowering a ground clearance to perform non-powered driving, and components of the vehicle 300 are collectively disposed in the frame to provide a compact structure to the vehicle 300.

Further, the vehicle 300 is designed to have a steering unit, a braking unit, and a vehicle body that have compact structures. For example, the vehicle 300 is designed such that a rotor is located inside the wheels of the vehicle 300, and the rotor is machined to have a size and a shape such that the rotor is located inside the wheels.

Further, a steering device of the vehicle 300 is designed to utilize a spherical plane instead of a rod end.

Further, the vehicle 300 includes a preset weight, a preset height of the center of weight, preset front and rear and left and right distribution of the weight, a wheel alignment, and a caster, and includes wheels having a preset rolling resistance with a road surface of the track 200. When the vehicle 300 does not include a wheel, a frictional resistance between a contact portion of the vehicle body of the vehicle 300 or a road surface of the track 200 and the road surface of the track 200 is set to a preset value.

The length, the slope, the radius of rotation, and the super elevation of the track 200 is designed such that the vehicle 300 has at least one of a specified longitudinal acceleration and a specified transverse acceleration, and is designed such that the driver may feel the level of difficulty programmed in the track 200 when the vehicle 300 travels on the track 200.

The integrated operating server 100 receives driving information from the track 200 and the vehicle 300, and corrects the received driving information by comparing the driving information received from the track 200 and the driving information received from the vehicle 300.

In an embodiment, the vehicle 300 includes at least one power device. The power device included in the vehicle 300 may be used to perform temporary acceleration driving during performance of non-powered driving using the gravity.

Further, the power device included in the vehicle 300 is used when the vehicle 300 moves from the ending point of the track 200 to the starting point of the track 200.

Meanwhile, the embodiment disclosed for the types of the track 200 and the vehicle 300 is provided for exemplary illustration, and the types and operation methods of the track 200 and the vehicle 300 are not limited to the embodiment.

For example, the types of the vehicle 300 may include a vehicle, a car, a formula, a kart, a touring car, and a stock car, and the vehicle 300 may include the technical characteristics of a user device, a terminal, a mobile station, a mobile subscriber station (MSS), a subscriber station (SS), an advanced mobile station (AMS), a wireless terminal (WT), a machine type communication (MTC) device, a machine-to-machine (M2M) device, a device-to-device (D2D) device.

The above-mentioned example of the vehicle 300 is merely exemplary, and it has to be construed that the vehicle 300 according to the disclosed embodiment includes all mobile devices that may input and output data, which will be developed in the future, transmit and receive data, and display data, which has been already developed to be commercialized or will be developed later, in addition to the above-mentioned examples.

In the disclosed embodiment, the theme park system 10 for vehicle driving includes an internal dedicated network 500 that is used for communication between any two of the integrated operating server 100, the track 200, and the vehicle 300.

The internal dedicated network 500 includes a wired or wireless network. For example, the internal dedicated network 500 refers to a data communication network for transmission and reception of data, such as a text or a digital image between any two of the vehicles 300, at least one sensor in the track 200 connected to the vehicle 300, and the integrated operating server 100, and the kind of the internal dedicated network 500 is not specifically limited.

For example, the internal dedicated network 500 may be an optical cable based wired communication system that provides a transmission/reception service for data by using an optical cable, and otherwise, and may be an internet protocol (IP) network that provides a transmission/reception service for high capacity data through an internal protocol (IP) or an all IP network in which different IP networks are integrated.

Further, the internal dedicated network 500 may be at least one or a combination of a wireless network, a mobile communication network including a wireless broadband (Wibro) network and WCDMA, a mobile communication network including a high speed downlink packet access (HSDPA) network and a long term evolution (LTE) network, a mobile communication network including LTE advanced (LTE-A), a satellite communication network, and a Wi-Fi network, and it may be construed that the internal dedicated network 500 includes a short range communication technology including Bluetooth Low Energy (BLE), a radio frequency identification (RFID), an infrared data association (IrDA), a ultra wideband (UWB), ZigBee, and Z-wave.

Meanwhile, the internal dedicated network 500 has to provide a sufficient speed to deliver driving information of the vehicle 300 to the integrated operating server 100 in real time. Further, the internal dedicated network 500 has to provide a high security that prevents the information delivered from the track 200 and the vehicle 300 from being exposed to the outside.

Accordingly, the internal dedicated network 500 is configured to be used only for communication between any two of the integrated operating server 100 and the operator of the integrated operating server 100, and the track 200, and the vehicle 300, and is configured such that a user who does not have an authority cannot access the internal dedicated network 500 from the outside.

In an embodiment, the internal dedicated network 500 further includes an internal dedicated network 510 that is extended to the integrated operating server 100 and the control room, the terminal of the operator, and the other facilities. The internal dedicated network 500 and the extended internal dedicated network 510 are configured such that a user who does not have an authority cannot access them from the outside but the authority for accessing the internal dedicated network 500 and the authority for accessing the extended internal dedicated network 510 may be set differently.

The access authority for accessing the internal dedicated network 500 and the access authority for accessing the extended internal dedicated authority 510 may be set independently, and may be set to have an upper or lower level relationship.

In an embodiment, the theme park system 10 for vehicle driving may include an integrated control monitor that is installed in the control room (integrated control room) of the theme park to display an operating situation of the theme park.

Further, the theme park system 10 for vehicle driving includes one or more display devices that are installed at several sites of the theme park to display information on the theme park.

The integrated operating server 100 may display an operation situation of the theme park on the integrated control monitor by using the information received from the at least one vehicle 300 and the track 200, and may transmit necessary information to the at least one display device to allow the display device to display the information.

Further, the theme park system 10 for vehicle driving includes one or more detection device for detecting an emergency situation including a fire of the theme park, a natural disaster, or an abnormality of communication.

When one or more detection devices detect an emergency situation, the integrated operating server 100 may automatically take an emergency contact with an external institute and may display information on the emergency situation on the integrated control monitor.

Further, the theme park system 10 for vehicle driving may further include an information collecting device that may collect information from the user client 400 or a ticket issued by the theme park.

When the user makes a reservation for use of the track 200 or the vehicle 300, a reservation ID is generated, and an electronic ticket may be given to the user client 400 and an actual ticket may be provided to the user by the theme park.

Further, an access control device for controlling an access to the track 200 may be installed at a location to the starting point for driving on the track 200.

The integrated operating server 100 may determine an authority of the user for an access to the track 200 based on the information collected by the information collecting device and may control the access control device based on the determination result.

Further, the integrated operating server 100 may control lighting devices and acoustic systems installed at several sites of the theme park.

Further, the theme park system 10 for vehicle driving may further include a preservation facility for preserving one or more vehicles 300.

The integrated operating server 100 may determine a state of the preservation facility, and may control an environment maintenance device of the preservation facility according to the determination result.

Further, the integrated operating server 100 may obtain information on the states and the driving histories of the one or more vehicles 300 from the vehicle IDs of the one or more vehicles 300 preserved in the preservation facility and manage the information.

In the disclosed embodiment, the integrated operating server 100 transmits a control signal to control a movement of the vehicle 300 based on the travel information received from the track 200 or the vehicle 300. For example, the integrated operating server 100 may control the speed of the vehicle 300 to prevent a collision when it is determined that there is a danger of a collision based on the distance between the one or more vehicles 300.

Accordingly, the internal dedicated network 500 has to provide a sufficient speed to control a movement of the vehicle 300 in real time before an accident occurs, and has to provide a security of a high level to prevent a danger of controlling the vehicle 300 through an external manipulation.

In an embodiment, the driving information collected by the track 200 and the vehicle 300 is divided into real-time information that has to be delivered to the integrated operating server 100 in real time and non-real-time information that does not need to be delivered to the integrated operating server 100 in real time, and information transmission frequencies for the real-time information are determined.

The real time information is delivered to the integrated operating server 100 according to the information transmission frequency determined during driving of the vehicle 300, and the non-real-time information is delivered to the integrated operating server 100 after the driving of the vehicle 300 is ended.

For example, data, such as lap time, location information of the vehicle, whether the vehicle is normal, a driving image, may be collected from the track 200 and the vehicle 300 while the vehicle 300 is driven. Among the collected data, data on information on the lap time, the location information, whether the vehicle is normal, the driving image, and the like corresponds to real-time information that has to be delivered to the integrated operating server 100 in real time for progress and safety of the game. Meanwhile, a high-quality driving image corresponds to non-real-time information that may be delivered after the driving is ended.

As compared with the non-real-time information, such as a high-quality driving image, the data capacity of real-time information such as lap time, location information, and whether the vehicle is normal is not large so that a high transmission speed may be secured by selectively transmitting the real-time information.

The integrated operating server 100 obtains user information from the user client 400 of the user who uses the theme park for vehicle driving. The integrated operating server 100 obtains user information from the user client 400 by using a mobile network or a wireless network such as Wi-Fi.

In the disclosed embodiment, the wireless network used to obtain user information from the user client 400 by the integrated operating server 100 is distinguished from the internal dedicated network 500 used to obtain driving information from the track 200 and the vehicle 300.

For example, the internal dedicated network 500 may be a security network that is managed by the theme park system 10 for vehicle driving, and the wireless network used to obtain user information from the user client 400 may be a general commercial network provided by communication companies.

In an embodiment, the user client 400 corresponds to a mobile terminal of the user or an application installed in the mobile terminal. In another embodiment, the user client 400 may correspond to a wireless communication terminal that is provided to the user by the theme park for vehicle driving. Further, the user client 400 may correspond to an NFC or RFID tag that is provided to the user by the theme park for vehicle driving.

The integrated operating server 100 obtains information, such as a user ID and a location of the user, on the user who uses the theme park for vehicle driving from the user client 400.

In an embodiment, the theme park system 10 for vehicle driving may include one or more information collecting devices for collecting user information from the user client 400.

For example, the theme park system 10 for vehicle driving may receive information from the user client 400 by using Wi-Fi or Beacon and may determine a location of the user client 400. The integrated operating server 100 may obtain an accurate location of the user client 400 by combining GPS information received from the user client 400 and information received by using an information collecting device.

In an embodiment, vehicle IDs for identifying the one or more vehicles 300 are allocated to the one or more vehicles 300, respectively.

Further, track IDs for identifying the one or more tracks 200 are allocated to the one or more tracks 200, respectively.

User IDs for identifying one or more users who use the one or more user clients 400 are allocated to the one or more user clients 400, respectively, and reservation IDs for the reservations of driving are generated when the users make reservations for driving of the track. One or more reservation IDs may be present in the one user ID.

The integrated operating server 100 generates a driving ID by using at least one of the user IDs of the one or more users, the reservation IDs, the vehicle ID of the vehicle 300 used by the one or more users, and a track ID of the track 200 on which the vehicle 300 travels.

The integrated operating server 100 classifies, analyses, stores, and manages the driving information received from the track 200 and the vehicle 300 by using the generated driving ID.

Accordingly, the integrated operating server 100 may easily classify the records of the users according to the vehicle 300 used by the users and the track 200 on which the vehicle 300 traveled and manage the classified records.

In an embodiment, when the user gets on the vehicle 300, the integrated operating server 100 obtains information on the vehicle 300 on which the user is on and information on the track on which the vehicle 300 travels.

For example, the integrated operating server 100 obtains information on the vehicle 300 on which the user is on and the track 200 on which the vehicle 300 travels, from the user client 400. The user may make a reservation for the vehicle 300 and the track 200 that are to be used, by using the user client 400. The user client 400 may transmit the information on the vehicle 300 reserved by the user to the integrated operating server 100.

As another example, the user client 400 may deliver information on the user to the vehicle 300 by using an NFC, an RFID, a barcode, or a QR code, and the vehicle 300 may deliver a vehicle ID and a user ID to the integrated operating server 100.

Hereinafter, an example of delivering the user information to the vehicle 300 by using a proximity card including a user ID will be described.

Here, the proximity card includes an radio frequency (RF) card and a near field communication (NFC) card, and refers to a card in which specific information is stored such that the information stored in the card in advance may be transmitted to one or more external devices within a specific radius range, and according to the disclosed embodiment, the proximity card may include user ID information of the passenger of the racing vehicle. Further, the proximity card may refer to the user client 400 equipped with an NFC function.

Further, vehicle IDs for identifying the one or more vehicles 300 may be stored in the interiors of the vehicles 300, respectively, or may be input to the vehicles 300, respectively.

When the user gets on the vehicle 300, the user may input his or her user ID to the vehicle 300 to use the vehicle 300.

In more detail, the vehicle 300 may further include a user input unit that may receive a user ID from the above-mentioned proximity card or the user client 400, and the user may move the proximity card or the user client 400 towards the user input unit such that the proximity card or the user client 400 may be recognized by the user input unit or may input his or her user ID to the vehicle 300 before getting on the vehicle through a direct input method.

Meanwhile, the vehicle 300, to which the user inputs his or her user ID, may generate a driving ID by combining the input user ID, the vehicle ID input to or stored in the vehicle 300, and the reservation ID given to the user ID, and may transmit the generated driving ID to the integrated operating server 100. Further, the vehicle 300 may generate the driving ID by combining the information on the track 200, on which the vehicle 300 travels, together. Further, the vehicle 300 may generate the driving ID by using a time stamp of a time band, in which the vehicle 300 travels.

As an example, at least one of the user ID, the vehicle ID, the track ID, and the time stamp is delivered to the integrated operating server 100, and the driving ID is generated by combining the IDs received by the integrated operating server 100.

Then, the driving ID may be realized in a form in which at least one of the user ID, the vehicle ID, the track ID, the reservation ID, and the time stamp is included or in a form in which at least one of the user ID, the vehicle ID, the track ID, the reservation ID, and the time stamp are combined according to a specified reference.

Meanwhile, the integrated operating server 100 that received the driving ID from the vehicle 300 or generated the driving ID by using the received IDs obtains information on the vehicle 300 driven by the user and the track 200, based on at least one of the user ID, the vehicle ID, the track ID, the reservation ID, and the time stamp included in the driving ID.

Meanwhile, the user on the vehicle 300 may use the vehicle 300 for a specific period of time or a specific number of times. According to the disclosed embodiment, use of the vehicle 300 includes driving of the vehicle 300, and the vehicle 300 travels on the track 200 including one or more sensors connected to the vehicle 300 in advance.

Meanwhile, when the user gets on the vehicle 300 and drives the vehicle 300 on the track 200, the one or more sensors connected to the vehicle 300 in the track 200 in advance may measure racing related information or track driving record data (hereinafter, referred to as driving information) including the velocity, the acceleration, the speed, the location, the direction, the driving path, and the time of the vehicle 300 at a specific cycle, and may generate a sensing signal for detecting a current state of the vehicle 300, such as a distance between the one or more vehicles 300, whether there occurs an accident, a left use time, and a left number of uses, to measure the driving information.

To achieve this, the one or more sensors may be realized by different sensors, and may include sensors that have been already developed or will be developed in the future, including a motion sensor, a gyro sensor, an acceleration sensor, and a location measuring sensor.

Here, the motion sensor is a sensor for detecting a location or a movement of the vehicle 300 and may include an acceleration sensor and a gyro sensor, and the acceleration sensor is a sensor that may measure a change of an acceleration of the vehicle 300, by converting a change of an acceleration for any one direction of the vehicle 300 into an electrical signal to measure the converted change.

When the acceleration sensor is used together with Beacon for active sensing after Bluetooth 4.2 and Bluetooth 4.0, it may be recognized at which location of the track the vehicle 300 is passing through and at which speed the vehicle 300 moves the specific location so that an accurate time together with a movement speed may be measured.

Further, the gyro sensor is a sensor that measures an angular speed, and may detect a direction to which the vehicle 300 turned with respect to a reference direction.

Then, according to the disclosed embodiment, when one or more sensors connected to the vehicle 300 in the track measures racing related information of the vehicle 300 at a specified cycle as mentioned above, the one or more sensors in the track 200 may transmit the measured driving information to the integrated operating server 100. Then, the measured driving information may be transmitted together with at least one of a user ID, a vehicle ID, a track ID, a reservation ID, and a time stamp.

In another embodiment, the track 200 includes a communication module for transmitting the driving information received from the one or more sensors in the track 200 to the integrated operating server 100, and a control box (control unit) for controlling the communication module. The integrated operating server 100 receives sensor information measured for the vehicle 300, by the track 200 and the vehicle 300.

Through this, the integrated operating server 100 may easily recognize information on which passenger or which racing vehicle the driving information received from the one or more sensors in the track 200 is, and may classify the driving information transmitted from the one or more sensors in the track 200 at every specific cycle into a user ID, a vehicle ID, a reservation ID, and a track ID to store or manage the classified driving information.

That is, the integrated operating server 100 that received the driving information from the one or more sensors in the track 200 and received the driving ID information from the vehicle 300 may constitute a driving record database based on the driving ID, and the driving record database may be personalized by classifying the driving information for a user ID, a vehicle ID, a reservation ID, and a track ID included in the driving ID information and may be customized according to a specified setting.

Meanwhile, the driving record database constituted by the integrated operating server 100 determines ranking information by using the driving information.

For example, the driving information includes a speed, a transverse acceleration, location information, a yaw rate, and a driving image of the vehicle 300 collected from the one or more sensors during driving of the vehicle 300.

The ranking information includes ranking information according to the driving results of the users. The ranking information may include whether time limits of the vehicles are satisfied, the rankings, whether the the vehicles have traveled to the ending point of the track, the number of over taking, the number of being overtake, the number of successes of drift, and the number of braking.

The integrated operating server 100 may generate additional information including rankings of the one or more vehicles by analyzing sensor information, and may provide a user service including the generated additional information to the user client 400.

Meanwhile, the ranking information included in the driving record database constituted by the integrated operating server 100 may be displayed by the display device included in the theme park system 10 for vehicle driving, and may be transmitted to the user client 400 and be displayed through the display unit of the user client 400.

According to the disclosed embodiment, the integrated operating server 100 may receive driving information of the vehicle 300 and information of the user who drives the vehicle 300, and when the driving information of the vehicle 300 satisfies a specific condition, may provide the driving information as a point in the form of a virtual coil or an experience value that may be used in the theme park to the user. For example, the virtual coil refers to a point that may be used like cash in the theme park, and the game experience value may be utilized for the purpose of classifying grades for the user IDs.

In an embodiment, the integrated operating server 100 may provide a virtual coil to the user or a point in the form of a game experience value by using the generated ranking information. For example, when it is determined that the generated ranking information attains a specified specific reference (for example, driving to the ending point of the track within a limited time, the number of being passes is 0, three successes in drift, and when the racking is a specified ranking or more), a message may be transmitted to the user client 400, and the transmitted message may include a coupon, a point, an item, and a congratulation message that may be used by the theme park.

According to the disclosed embodiment, the integrated operating server 100 may receive general visitor information including private information such as the age, the sex, and the preference of a general visitor, except for the user who uses the vehicle 300, and information on articles purchased by the general visitor, from the user client 400 of the general visitor, and in response, may transmit a general visitor message including a message or a guide to a mobile terminal of the general visitor.

Then, the general visitor message may include guide information on a preferred racing of the general visitor determined based on the received general visitor information, a coupon that may be used, and a message that promotes a challenge to the preferred racing, and may further include ranking information before the general visitor message is transmitted.

In an embodiment, the integrated operating server 100 receives reservation request information from the user client 400. The integrated operating server 100 obtains information on the use states of the one or more vehicle 300 and the track 200. The integrated operating server 100 makes a reservation for the vehicle 300 and the track 200 that may be used, generates a reservation ID, and transmits reservation completion information including the reservation ID to the user client 400.

When the vehicle 300 and the track 200 cannot be used, the integrated operating server 100 transmits standby reservation information after a reservation for standby.

In an embodiment, the integrated operating server 100 obtains information on the use states of the one or more vehicles 300 and the track 200, and transmits information on the obtained use states to the user client 400.

The user client 400 may select the vehicle 300 and the track 200 that may be used, and may transmit a request for a reservation or a standby reservation for the vehicle 300 and the track 200 that were selected to the integrated operating server 100. The integrated operating server 100 performs a reservation or a standby reservation based on the received request and transmits reservation completion information to the user client 400.

Figure 2:
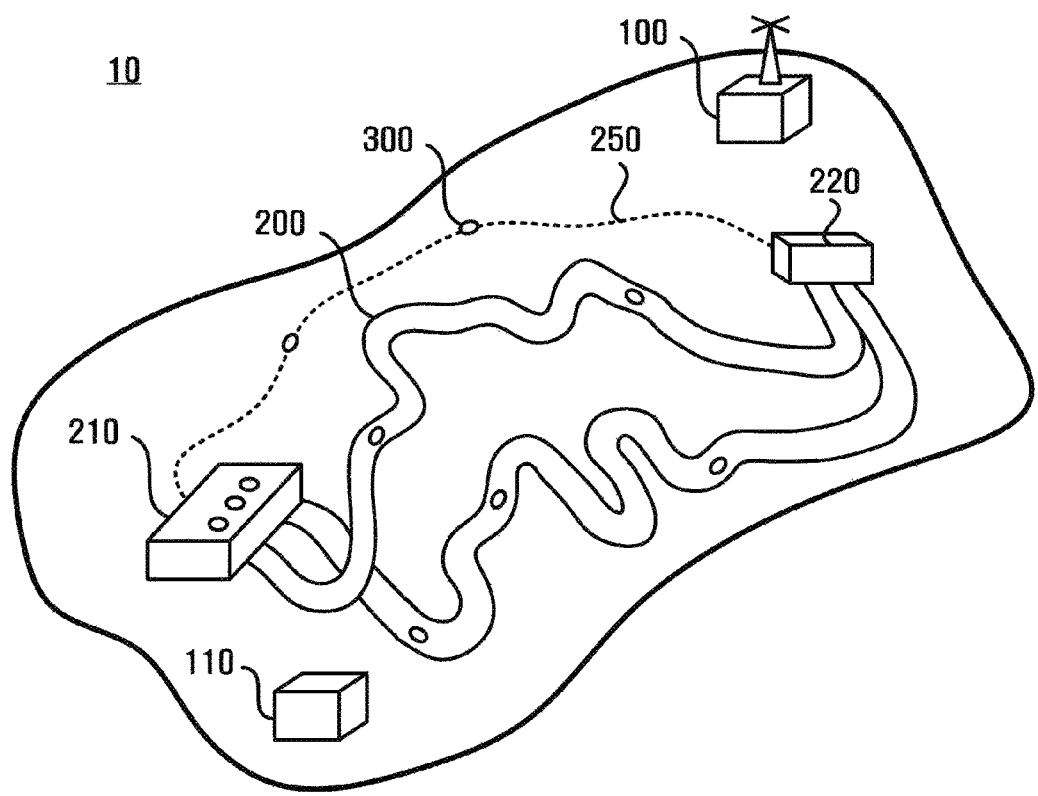
FIG. 2 is a view illustrating a theme park for vehicle driving according to an embodiment.

FIG. 2 is a view illustrating a theme park for vehicle driving according to an embodiment.

The theme park 10 for vehicle driving illustrated in FIG. 2 includes an integrated operating server 100, a track 200, a vehicle 300, and other facilities 110. The contents on the integrated operating server 100, the track 200, and the vehicle 300 described with reference to FIG. 1 are applied to the integrated operating server 100, the track 200, and the vehicle 300 described with reference to FIG. 2.

Referring to FIG. 2, the track 200 includes one or more courses. Further, although the courses of FIG. 2 correspond to a single lane, the courses may include a plurality of lanes.

Referring to FIG. 2, the theme park 10 for vehicle driving further includes a guide line 250 for moving the vehicle 300 from an ending point 220 of the track 200 to a starting point 210 of the track 200.

For example, if the passenger finishes driving of the determined track by using the vehicle, the vehicle is converted to an automatic driving mode to automatically return to a starting part along the guide line 250 by driving an internal sensor and a motor. The guide line 250 refers to a return lane that is equipped with a magnet or similar equipment for guiding the vehicle 300.

The vehicle 300 includes a function of maintaining a preset speed and a vehicle interval in an electronic system in the vehicle when the return function is performed and automatically decelerating and stopping the vehicle when an obstacle is detected. The automatic driving function may be utilized for moving the vehicle to a specific location in the park as well as returning the vehicle.

In an embodiment, the vehicle 300 may include a sensor such as an infrared ray, a laser, or a PSD to detect a front obstacle, and includes an electronic system such that a driving unit and a sensor unit in the electronic system of the vehicle 300 may perform communication of the vehicle and the driving unit may be controlled in consideration of the front situation detected through the sensor unit.

Referring to FIG. 2, the theme park system 10 for vehicle driving includes one or more other facilities 110. The other facilities 110 include a display device for displaying ranking information of the vehicles 300, or a restaurant or a store. In the restaurant and the market included in the theme park system 10 for vehicle driving, a virtual coin obtained according to the vehicle driving by the users may be used.

Figure 3:
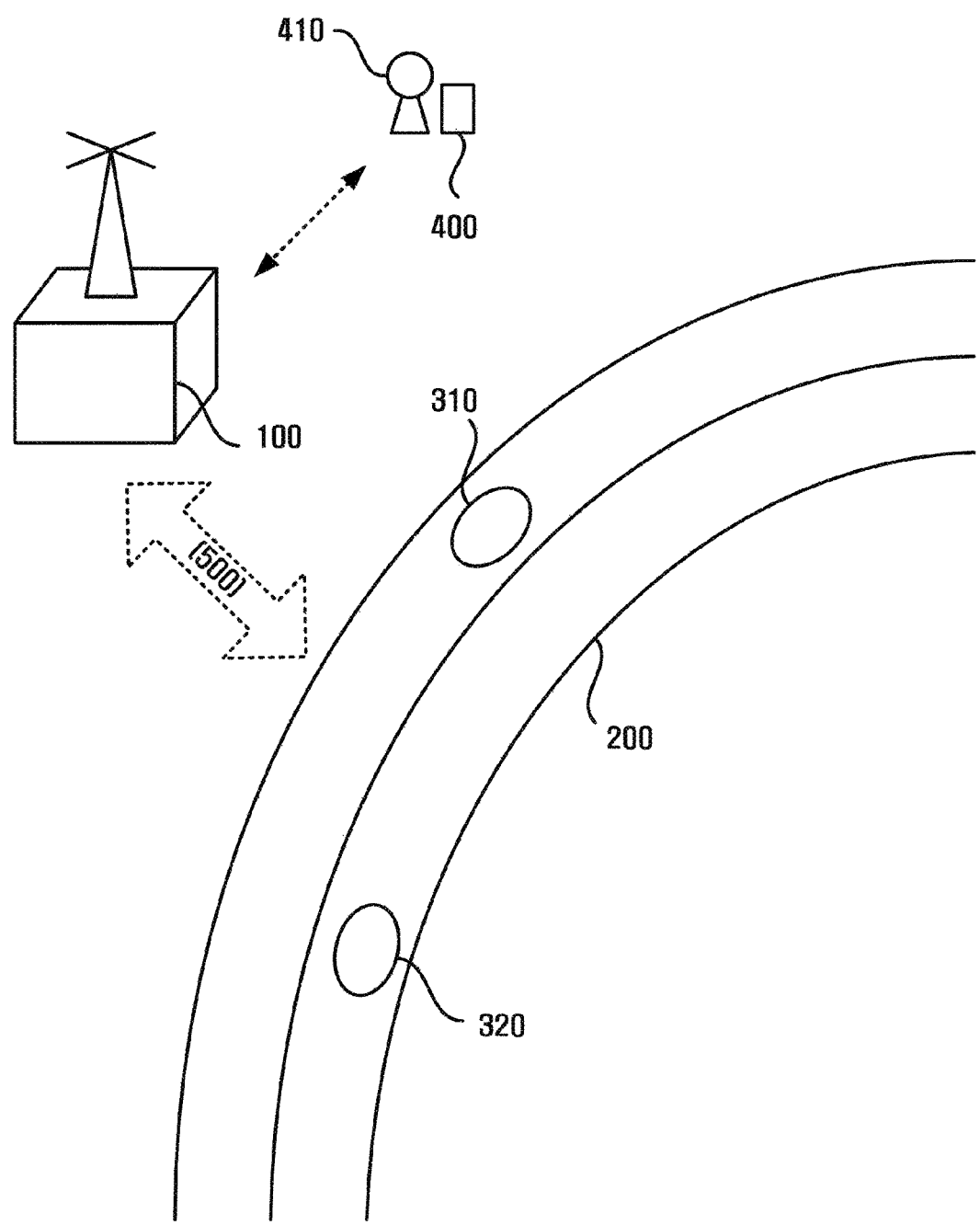
FIG. 3 is a view illustrating an example of traveling on a track in a theme park for vehicle driving by a vehicle.

FIG. 3 is a view illustrating an example of traveling on a track in a theme park for vehicle driving by a vehicle.

Referring to FIG. 3, the track 200 may include a plurality of lanes. The first vehicle 310 and the second vehicle 320 travel on the lanes of the track 200. The first vehicle 310, the second vehicle 320, and the track 200 communicate with the integrated operating server 100 through an internal dedicated network 500.

Further, the integrated operating server 100 communicates with the user client 400 through a general wireless network. The user 410 may be a passenger who drives the first vehicle 310 or the second vehicle 320, and may be a third person who watches the racing of the first vehicle 310 and the second vehicle 320 from the outside.

In an embodiment, the user 410 may use an item that is necessary for driving of the vehicle by using the user client 400. The item may be obtained based on the driving result or ranking information of the vehicle. Further, the user may obtain an item by paying cash or a virtual coin.

In an embodiment, the item is used to request a temporary acceleration or deceleration of the vehicle. For example, the user 410 may use an item that requests a temporary acceleration of the first vehicle 310. If the user 410 selects the item that requests a temporary acceleration of the first vehicle 310, the user client 400 makes a request for a temporary acceleration of the first vehicle 310 to the integrated operating server 100. The integrated operating server 100 receives the request for a temporary acceleration, and transmits control information to perform a temporary acceleration to the first vehicle 310. The first vehicle 310 may receive the control information to perform a temporary acceleration from the integrated operating server 100, and may perform a temporary acceleration.

As another example, the user 410 may use an item that requests a temporary deceleration of the second vehicle 320. If the user 410 selects the item that requests a temporary deceleration of the second vehicle 320, the user client 400 makes a request for a temporary deceleration of the second vehicle 320 to the integrated operating server 100. The integrated operating server 100 receives the request for a temporary acceleration, and transmits control information to perform a temporary deceleration to the second vehicle 320. The second vehicle 320 may receive the control information to perform a temporary deceleration from the integrated operating server 100, and may perform a temporary deceleration.

In an embodiment, the integrated operating server 100 receives driving information including the driving speeds of the first vehicle 310 and the second vehicle 320. The integrated operating server 100 may transmit a feedback to the first vehicle 310 and the second vehicle 320 based on the driving information of the first vehicle 310 and the second vehicle 320.

For example, when the driving speed of the first vehicle 310 exceeds a specific threshold, the integrated operating server 100 delivers a warning message to the first vehicle 310 or the user client 400 of the user 410 who drives the first vehicle 310. As another example, the integrated operating server 100 delivers a warning message to the user 410 by using a display device or an audio device installed in the track 200.

As another example, when the driving speed of the first vehicle 310 exceeds a specific threshold value, the integrated operating server 100 transmits a deceleration control command to the first vehicle 310. If the first vehicle 310 receives a deceleration control command, the first vehicle 310 may decrease the speed of the first vehicle 310 by using a deceleration device or restricting the output of the power device.

Figure 4:
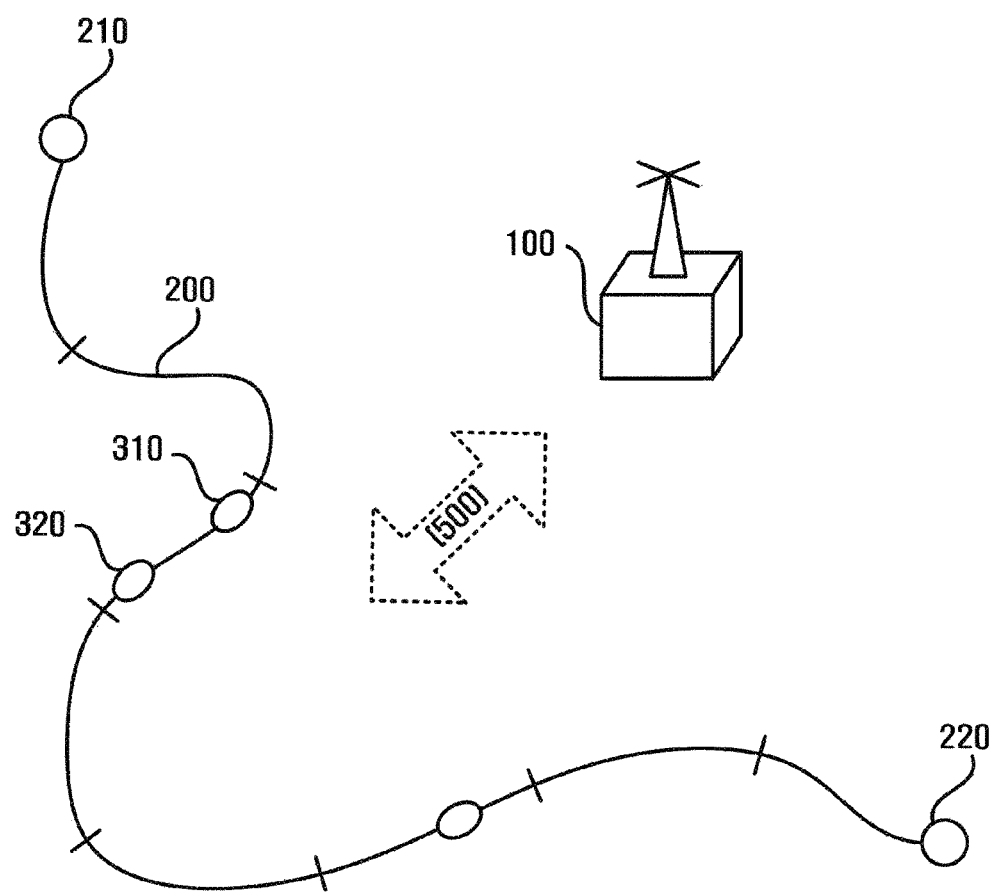
FIG. 4 is a view illustrating a method for dividing a track into a plurality of zones according to an embodiment.

FIG. 4 is a view illustrating a method for dividing a track into a plurality of zones according to an embodiment.

Referring to FIG. 4, an area between the starting point 210 and the ending point 220 of the track 200 may be divided into a plurality of zones. One or more sensors may be installed in each of the divided zones.

The integrated operating server 100 determines the driving times for the zones of the vehicles 310 and 320 that travels on the track 200 and the number of vehicles that travel on each of the zones. The integrated operating server 100 receives information detected by the sensors installed in the zones of the track 200 through the internal dedicated network 500.

Further, the integrated operating server 100 may receive location information from the vehicles 310 and 320 that travel on the track 200 to determine a relative location to the other vehicles on the track 200. The integrated operating server 100 may generate information on the driving of the vehicles 310 and 320 by complementarily utilizing the information received from the track 200 and the information received from the vehicles 310 and 320.

In an embodiment, one or more vehicles may travel in the same lane of the track 200. For example, the integrated operating server 100 may determine that a new vehicle may start driving of the track 200 when the the vehicle that is traveling on the track 200 ends the driving by a specific level or more.

In this case, the interval between the second vehicle 320 and the first vehicle 310 may become narrower due to the difference between the speeds of the second vehicle 320 that started first and the first vehicle 310 that started later. For example, the first vehicle 310 and the second vehicle 320 may travel in the same zone. In this case, the integrated operating server 100 may determine that there is a danger of collision of the first vehicle 310 and the second vehicle 320 and delivers a warning message to the first vehicle 310 and the second vehicle 320.

Further, the integrated operating server 100 transmits a deceleration control command to the first vehicle 310. If the first vehicle 310 receives a deceleration control command, the first vehicle 310 may decrease the speed of the first vehicle 310 by using a deceleration device or restricting the output of the power device.

Further, the integrated operating server 100 transmits a temporary acceleration command to the second vehicle 320. If the second vehicle 320 receives a temporary acceleration command, the second vehicle 320 performs a temporary acceleration by using the power device.

Further, the integrated operating server 100 may suggest a target that is to be attained by the vehicle that travel on each of the zones according to at least one of the slope, the super elevation, the length, and the radius of rotation of the track 200. For example, the integrated operating server 100 may measure the speed, the acceleration, the number of braking of the vehicle that is traveling for each of the zones and the transverse acceleration applied to the traveling vehicle based on the super elevation and the radius of rotation for each of the zones of the track 200 to provide a feedback when the values satisfy a specific condition. For example, the integrated operating server 100 may provide a virtual coil to the user of the vehicle that satisfies a specific condition, or may provide a point in the form of an experience value of the game.

Figure 5:
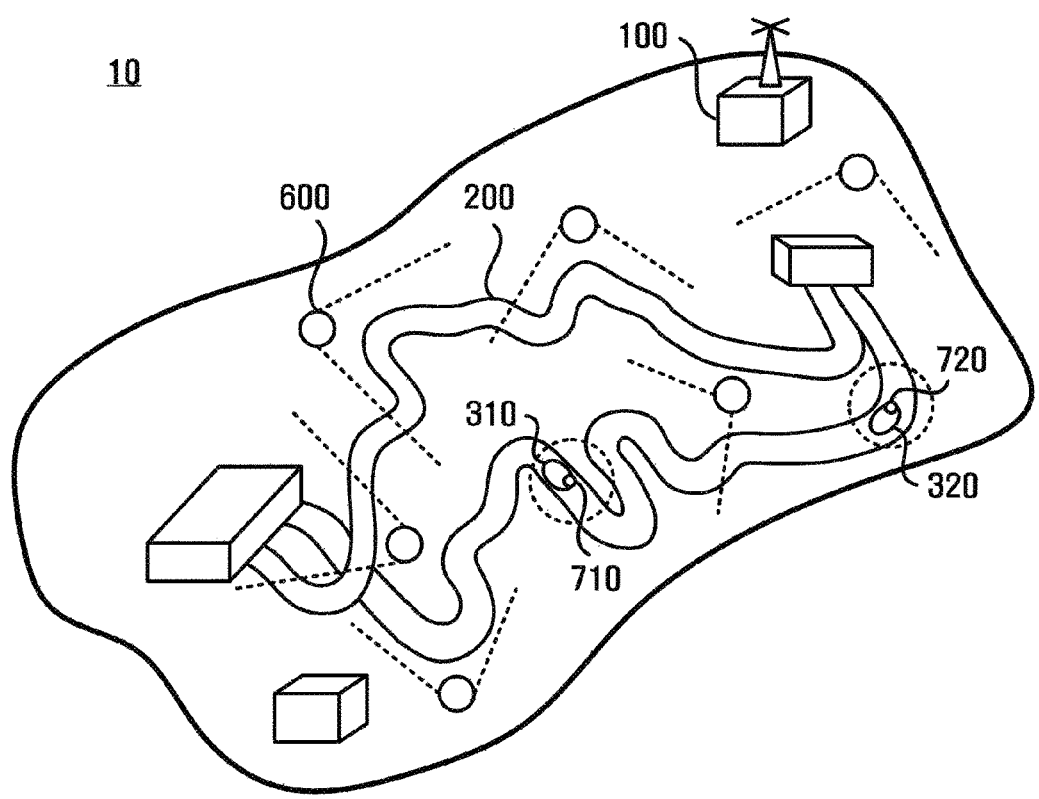
FIG. 5 is a view illustrating a method for disposing cameras in a theme park for vehicle driving according to an embodiment.

FIG. 5 is a view illustrating a method for disposing cameras in a theme park for vehicle driving according to an embodiment.

Referring to FIG. 5, the theme park system 10 for vehicle driving may include one or more cameras 600.

The one or more cameras 600 are used to photograph and record the zones of the theme park for vehicle driving.

In an embodiment, the one or more cameras 600 may be used to photograph and record the zones of the track 200.

The cameras 600 are disposed to photograph the zones of the track 200, and photographs the appearance of the user on the vehicle 300 when the user travels in each of the zones. The integrated operating server 100 displays the captured picture on the display device or transmit the captured picture to the user client 400. The user may select and purchase a desired one of the pictures displayed on the display device.

Further, the cameras 600 may photograph the appearance of the user on the track with an image and transmit the image to the integrated operating server 100.

Further, the theme park system 10 for vehicle driving further includes at least one action cams 710 and 720 installed in the vehicles 310 and 320 that travels on the tracks 200.

The action cams 710 and 720 capture images related to the driving of the vehicles 310 and 320 while the vehicles 310 and 320 travel. The vehicles 310 and 320 or the action cams 710 and 720 transmit the images captured by the action caps 710 and 720 to the integrated operating server 100.

In an embodiment, the action cams 710 and 720 may include 360 degree cameras, but the kinds of the cameras that may be included in the action cams 710 and 720 are not limited.

The images captured by the cameras 600 and the action cams 710 and 720 may be transmitted to the integrated operating server 100 by using the internal dedicated network 500 or an external dedicated network. However, when the images captured by the cameras 600 and the action cams 710 and 720 are not real-time information that has to be transmitted to the integrated operating server 100 in real time, the images may be collected after the driving is ended and may be transmitted to the integrated operating server 100.

Further, in order to distinguish the images from the real-time information, the image data captured by the cameras 600 and the action cams 710 and 720 may be transmitted through a separate internal dedicated network or an external general network that is distinguished from the internal dedicated network 500, through which the real-time information is transmitted.

The integrated operating server 100 may provide the image data captured by the cameras 600 and the action cams 710 and 720 or the edited image data to the user client 400.

The steps of a method or an algorithm that have been described in relation to the embodiments of the inventive concept may be directly implemented by hardware, may be implemented by a software module executed by hardware, or may be implemented by a combination thereof. The storage unit 130 may reside in a random access memory (RAM), a read only memory (ROM), an erasable programmable ROM (EPROM), an electrically erasable programmable ROM (EEPROM), a flash memory, a hard disk, a detachable disk, or a computer readable recording medium in an arbitrary form, which is well known in the art to which the inventive concept pertains.

According to the disclosed embodiment, a method for efficiently managing a theme park by using a network and an Internet of Thing (IoT) technology is provided.

In detail, the user may directly drive vehicles on the track, driving information may be generated through one or more sensors, and an interest due to an interaction may be invoked as the user is provided with a feedback.

Further, because data communication may be made promptly and safely by using an internal dedicated network and a danger situation may be automatically prevented by a server, an accident by a mistake of a person may be prevented.

Further, a theme park may be managed efficiently and organically with little manpower by obtaining use situations of the vehicles and the tracks in the theme park and information on the user through an integrated operating server.

The aspect of the inventive concept is not limited thereto, and other unmentioned aspects of the inventive concept may be clearly appreciated by those skilled in the art from the following descriptions.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A theme park system for vehicle driving, comprising:
one or more tracks including at least one sensor; and
an integrated operating server configured to
receive sensor information from the one or more track and one or more vehicles that travel on the one or more tracks through an internal dedicated network used in the interior of a theme park for vehicle driving,
wherein the sensor information includes vehicle driving information including at least one of a velocity, an acceleration, a speed, a location, a direction, a driving path, and a time of the one or more vehicles, which are collected by the one or more sensors mounted on the one or more vehicles, and the sensor information also includes driver identification information indicating a respective driver who drives a respective vehicle,
receive user information from one or more user client by using an external communication network that does not overlap the internal dedicated network,
generate driving managing information of the one or more vehicles by using the received sensor information and the received user information,
wherein the driving managing information indicates a user driving history of a respective user, and
manage the theme park system based on the generated driving managing information.

2. The theme park system of claim 1, wherein the one or more tracks are customized tracks, starting points of which are located at sites that are higher than ending points thereof and which are programmed by reflecting characteristics of a specified racing vehicle, wherein the lengths, the slopes, the radii of rotation, and the cants of the one or more tracks are designed such that the specified racing vehicle has at least one a specified longitudinal acceleration and a specified transverse acceleration, and wherein the driver is allowed to feel a programmed level of difficulty while driving the specified racing vehicle on the one or more tracks.

3. The theme park system of claim 1, wherein the one or more vehicles are compact vehicles which perform non-powered driving using the gravity, which increase aerodynamic efficiency by lowering ground clearances thereof, and parts of which are disposed in frames thereof in an integrated way.

4. The theme park system of claim 3, wherein each of the one or more vehicles includes:
a steering device using a spherical plane; and
a rotor located inside wheels of the one or more vehicles, and
wherein a size and a shape of the rotor is machined to be located inside the wheels of the one or more vehicles.

5. The theme park system of claim 3, wherein each of the one or more vehicles is a vehicle that is temporarily accelerated by a power device.

6. The theme park system of claim 1, wherein each of the one or more tracks further includes:
a guide line for moving the vehicle from an ending point of the track to a starting point of the track, and
wherein the vehicle automatically moves from the ending point of the track to the starting point of the track along the guide line if the driving is ended.

7. The theme park system of claim 1, wherein a vehicle identification (ID) for identifying the one or more vehicles is allocated to each of the one or more vehicles,
wherein a track ID for identifying the one or more tracks is allocated to each of the one or more tracks,
wherein one or more user IDs for distinguishing the one or more users who use the one or more user clients are allocated to each of the one or more user clients,
wherein a reservation ID is allocated to a driving reservation of each of the one or more users when the one or more users make a reservation for driving, and
wherein the integrated operating server generates a driving ID by using at least one of the user IDs of the one or more users, the reservation IDs for the driving reservations of the one or more users, the vehicle IDs of the vehicles used by the one or more users, and the track IDs of the tracks on which the vehicles travel, and classifies the generated driving managing information by using the generated driving IDs.

8. The theme park system of claim 1, wherein each of the one or more vehicles includes at least one sensor, and
wherein the sensor information collected by the at least one sensor included in the one or more vehicles and the one or more tracks is classified into real-time data and non-real-time data, an information transmission frequency is determined for the real-time data, the real-time data is delivered to the integrated operating server according to the determined information transmission frequency while the one or more vehicles travel, and the non-real-time data is delivered to the integrated operating server after the driving of the one or more vehicles is ended.

9. The theme park system of claim 1, wherein the integrated operating server receives reservation request information from a first user client, obtains information on the one or more vehicles and use states of the one or tracks, makes reservations for a vehicle and a track that are to be used by the first user client, and transmits reservation completion information to the first user client.

10. The theme park system of claim 1, wherein each of the one or more tracks is divided into one or more zones, and one or more sensors are installed in each of the one or more zones, and
wherein the integrated operating server determines driving periods of time for the zones of the vehicle that travel on the one or more tracks and the number of vehicles that travels the zones by using the one or more sensors installed in each of the one or more zones.

11. The theme park system of claim 1, further comprising:
an integrated control monitor installed in an integrated control room of the theme park and configured to display an operation situation of the theme park; and
one or more display device installed at several sites of the theme park and configured to display information on the theme park,
wherein the integrated operating server displays the operation situation of the theme park on the integrated control monitor by using the information received from the one or more vehicles and the one or more tracks, and
wherein the integrated control monitor transmits information that is necessary for the one or more display devices.

12. The theme park system of claim 11, further comprising:
one or more detection devices for detecting an emergency situation including a fire of the theme park, a natural disaster, or an abnormality of communication,
wherein when one or more detection devices detect an emergency situation, the integrated operating server automatically takes an emergency contact with an external institute and displays information on the emergency situation on the integrated control monitor.

13. The theme park system of claim 1, further comprising:
an information collecting device configured to collect information from the user client or a ticket issued by the theme park; and
an access control device for controlling an access to the track,
wherein the integrated operating server determines an access authority for the track of the user based on the information collected by the information collecting device and controls the access control device based on a determination result.

14. The theme park system of claim 1, wherein the integrated operating server controls lighting and acoustic systems of the theme park.

15. The theme park system of claim 1, further comprising:
a preservation facility for preserving the one or more vehicles,
wherein the integrated operating server determines a state of the preservation facility, controls the preservation facility according to a determination result, and manages states of the one or more vehicles and a vehicle driving history by using the vehicle IDs of the one or more vehicles preserved in the preservation facility.

16. The theme park system of claim 1, wherein the integrated operation server is further configured to generate user ranking information indicating a rank of the respective user, and display the generated ranking information.

17. The theme park system of claim 16, wherein the integrated operation server is further configured to calculate, based on the generated user ranking information, a reward point to be awarded to the respective user, and store the calculated reward point.

18. The theme park system of claim 1, wherein the integrated operation server is further configured to deliver a warning message to the one or more vehicles,
wherein the warning message include at least one of
a speed warning message configured to be delivered to a vehicle that exceeds a specific threshold speed, and
a collision warning message configured to be delivered to vehicles, in which an interval between the vehicles is determined to become narrower due to a difference between speeds of the vehicles.

19. The theme park system of claim 1, wherein the integrated operation server is further configured to register one or more items assigned to the respective user, and
wherein the one or more items include at least one of
a temporary acceleration item that is configured to control the integrated operation server to transmit a temporary acceleration control command to a vehicle being controlled by a user to which the temporary acceleration item is assigned, and a temporary deceleration item that is configured to control the integrated operation server to transmit a temporary deceleration control command to another vehicle being controlled by another user that is different from the user to which the temporary acceleration item is assigned.

* * * * *